(No Model.)
D. WIGGER.
AXLE BEARING.
No. 474,709. Patented May 10, 1892.
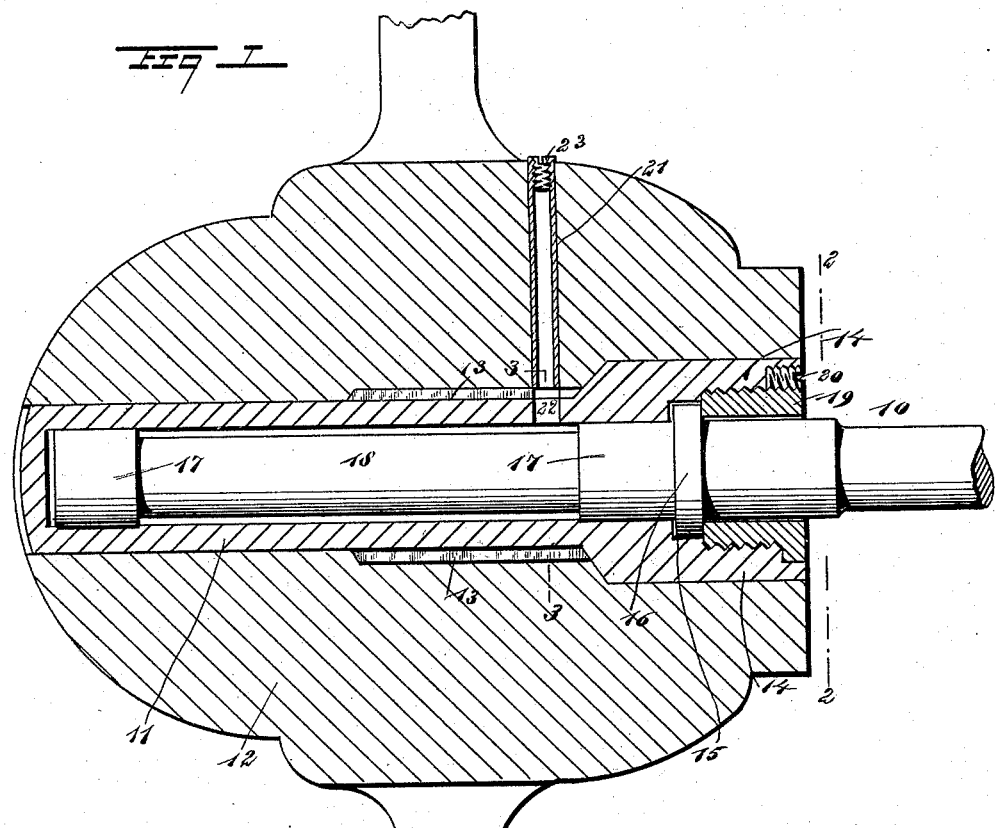
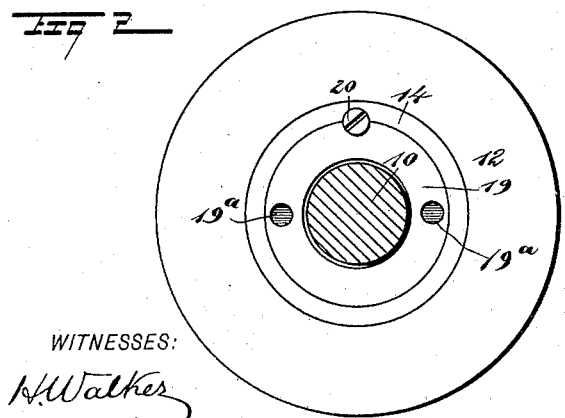
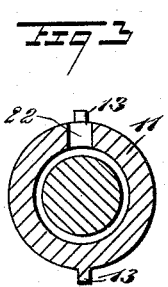
WITNESSES:
H. Walker
C. Sedgwick
INVENTOR:
D. Wigger
BY Munn & Co.
ATTORNEYS.

UNITED STATES PATENT OFFICE.

DAVID WIGGER, OF NEW YORK, N. Y.

AXLE-BEARING.

SPECIFICATION forming part of Letters Patent No. 474,709, dated May 10, 1892.

Application filed January 26, 1892. Serial No. 419,276. (No model.)

*To all whom it may concern:*

Be it known that I, DAVID WIGGER, of New York city, in the county and State of New York, have invented a new and Improved Axle-Bearing, of which the following is a full, clear, and exact description.

My invention relates to improvements in axle-bearings; and its object is to produce a simple, cheap, and easy-running bearing adapted to be applied to all sorts of wheeled vehicles and arranged in such a way that it may be oiled without removing the wheel-hub.

A further object of my invention is to construct the hub in such a way that when struck by the hub of another vehicle it will be forced out of the way and allowed to pass.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a vertical section of an axle-bearing and wheel-hub constructed in accordance with my invention. Fig. 2 is a cross-section on the line 2 2 in Fig. 1, and Fig. 3 is a cross-section on the line 3 3 in Fig. 1.

The axle 10 is journaled in an axle-box 11, which is held in the wheel-hub 12 in the usual way, having the ordinary flanges 13, which prevent it from turning in the hub, and the outer end of the box is closed. The outer end of the hub 12 is rounded off, as best shown in Fig. 1, and consequently when it comes in contact with another hub it will be wedged or squeezed to one side and allowed to pass. This is an improved feature of the invention, as it is well known that in the crowded streets of large cities vehicles become blocked by the interlocking of their hubs. The inner end of the box 11 is enlarged, as shown at 14 in Fig. 1, and is internally screw threaded to receive a fastening-nut, and is also provided with a recess 15, in which the collar 16 of the axle turns, and the end of the axle which enters the box is reduced in the center and is provided near the outer and inner ends of the box with enlarged bearing portions 17, upon which all the friction comes.

The hub 12 is secured to the axle by means of a hollow nut 19, which is mounted upon the axle and which fits snugly thereon and which turns into the threaded portion of the box 11, the inner end of the nut bearing against the collar 16 and preventing lateral movement of the hub. To guard against the loosening of the nut 19, a threaded bore is made partly in the nut and partly in the enlarged portion 14 of the box 11, and a screw 20 is screwed into this bore, as shown in Figs. 1 and 2. The nut 19 is provided on opposite sides with holes $19^a$ to receive the ends of a pin, wrench, or its equivalent, so that the nut may be conveniently tightened. A tube 21 extends transversely through one side of the hub 12, the inner end of the tube registering with a perforation 22 in the box 11 of the hub and the outer end of the tube is closed by a screw-plug 23, which is threaded into the tube. By moving the plug oil may be inserted in the tube and will flow into the box 11, and as the box does not touch the axle except at the parts 17 it will hold sufficient oil so that it need not be filled very often.

From the foregoing description it will be seen that this axle-bearing is very simple, that the wheel-hub may be easily applied to the axle when the parts are constructed as described, and that it is a very simple matter to oil the bearing.

Having thus described my invention, I claim as new and desire to secure by Letters Patent—

The combination of the axle-box having its outer end closed and its inner end recessed and screw-threaded, an axle having enlarged bearing portions within the box and a collar to fit the recess of the box, a nut mounted on the axle and adapted to enter the threaded portion of the box, and a binding-screw held partly in the nut and partly in the box, substantially as described.

DAVID WIGGER.

Witnesses:
WARREN B. HUTCHINSON,
C. SEDGWICK.